United States Patent [19]

Matsuo et al.

[11] 4,327,502

[45] May 4, 1982

[54] CONTROL DEVICE FOR A DRYING APPARATUS

[75] Inventors: Katsuharu Matsuo, Aichi; Tomio Hotta, Kuwana, both of Japan

[73] Assignee: Tokyo Shibaura Denki Kabushiki Kaisha, Kawasaki, Japan

[21] Appl. No.: 169,747

[22] Filed: Jul. 17, 1980

[30] Foreign Application Priority Data

Jul. 24, 1979 [JP] Japan .................................. 54-94069
Aug. 20, 1979 [JP] Japan ................................ 54-106267
Nov. 20, 1979 [JP] Japan ................................ 54-151189

[51] Int. Cl.³ ............................................. F26B 21/10
[52] U.S. Cl. ......................................... 34/43; 34/48; 34/55
[58] Field of Search .................... 34/45, 46, 48, 55, 43, 34/53

[56] References Cited

U.S. PATENT DOCUMENTS 3,758,959  9/1973  Karklys ................................... 34/48
3,762,064 10/1973  Offutt ..................................... 34/48
3,782,001  1/1974  Cotton .................................... 34/45
4,215,486  8/1980  Heyer et al. ............................ 34/45

FOREIGN PATENT DOCUMENTS 38-22437 10/1963 Japan .
48-4666   2/1973 Japan .

Primary Examiner—Larry I. Schwartz
Attorney, Agent, or Firm—Cushman, Darby & Cushman

[57] ABSTRACT

There is provided a memory circuit whose storage voltage changes with an instantaneous detection voltage indicating the drying rate of part of clothes successively brought in contact with a pair of electrodes. The voltage of the memory circuit is compared with a clothes drying rate setting signal, and thus a drying rate determination signal is obtained. When the determination signal reaches a given integration value, a heat source of a drying apparatus is automatically cut off.

9 Claims, 14 Drawing Figures

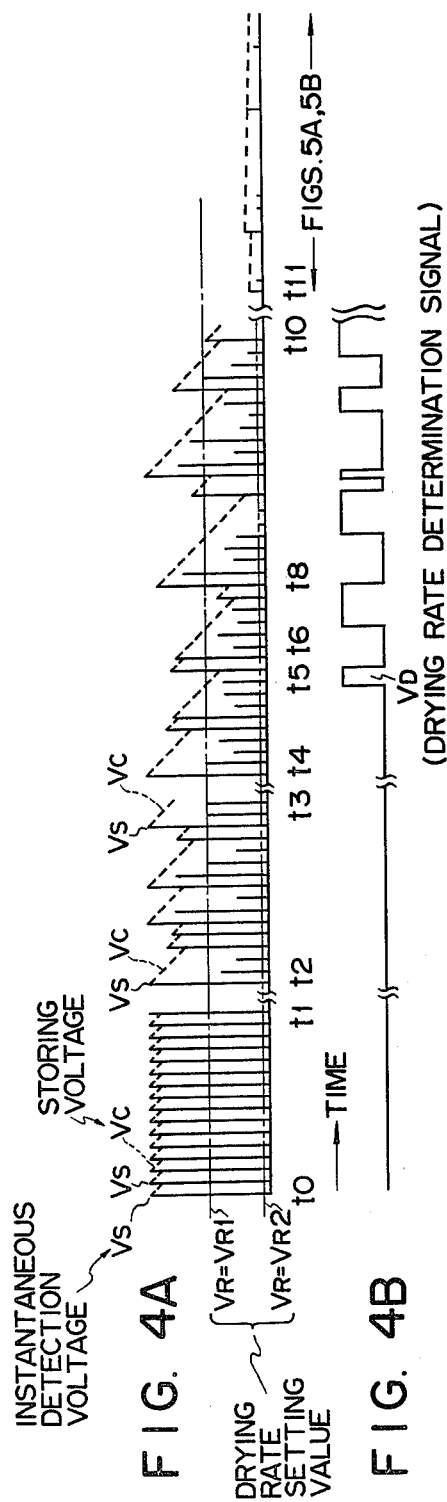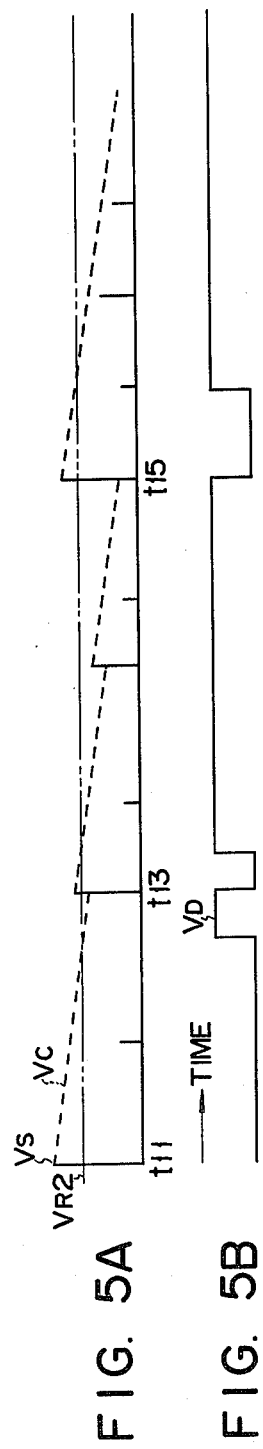

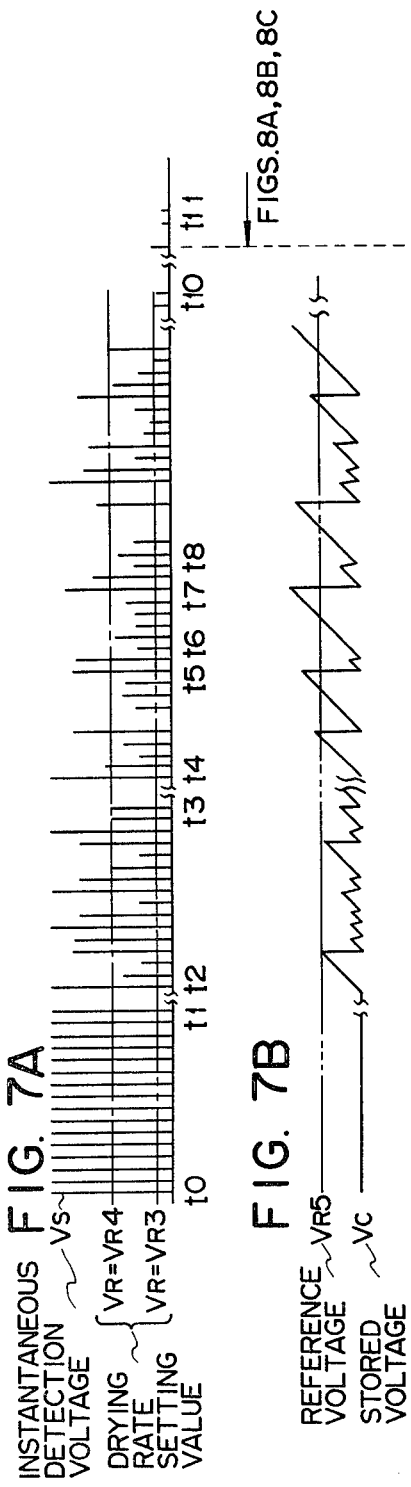

CONTROL DEVICE FOR A DRYING APPARATUS

This invention relates to a control device for a drying apparatus for determining the drying rate of clothes by detecting the electric resistance of the clothes.

As a system for determining the drying rate of clothes, there is known a system in which the electric resistance of the clothes is detected by means of a pair of electrodes. According to this system, the clothes are stirred within a rotating drum, so that portions of the clothes of which the electric resistances are to be detected are brought in contact with the pair of electrodes for an extremely short time. Accordingly, voltage signals obtained correspondingly to the electric resistances of the clothes produced between the electrodes are spikelike pulse voltages. Conventionally, the spikelike pulse voltages are integrated by a capacitor for integration or averaged, and the average value of the voltages is used as a detection signal for the drying rate of the clothes. However, since relatively dry clothes and relatively wet clothes coexist within the rotating drum, some undried clothes will possibly be regarded as being completely dried if the aforesaid average value is used as the detection signal for the determination of the drying state of the clothes. In order to avoid an incorrect result, voltage signals corresponding to relatively low drying rates, among the aforesaid pulse voltage signals corresponding to the electric resistances, are integrated and averaged by the capacitor, and the durations of average values exceeding a drying rate setting value, out of the resultant average values, are detected to determine the drying rate of the clothes. Such method is disclosed in Japanese Patent Publication No. 4666/73, for example.

The following problems have not, however, been solved yet.

(i) If the integration time constant is made relatively long in integrating and averaging the voltages between the pair of electrodes, the average values will vary according to the frequency of contact between the electrodes and cloth (clothes). Since the contact frequency is related to the quantity of cloth, drying rates obtained with use of such average values will be inaccurate, varying with the quantity of cloth.

(ii) If the average value of the voltage signals is to be obtained by reducing the integration time constant, the detected average voltage value will be subject to significant variations when fully dried clothes and wet clothes coexist. Therefore, if a drying rate setting value to be compared with the average value changes only slightly, the actual drying rates of clothes, when detected, will be changed by a large margin.

(iii) The operation modes of an actual drying apparatus includes a "semidry-state takeout" mode. In the "semidry-state takeout" mode, quickly dried clothes made of such material as synthetic fiber may be taken out during a drying operation of the drying apparatus, leaving undried clothes made of such material as cotton which is hard to dry, or clothes may be taken out undried for ironing. The determination of the time for the "semidry-state takeout" requires detection of the drying rate. With prior art apparatuses, however, there is a great difference between the detection result and actual value of drying rate, as described in items (i) and (ii). Accordingly, these apparatuses are not suited for the determination of the "semidry-state takeout" time delicately related to the actual drying rate.

(iv) Perfect drying requires every part of cloth or clothes to be thoroughly dried. In an actual drying operation, the region of wet portions of cloth is narrowed as the end of drying is approached, so that the frequency of contact between wet portions and the electrodes is reduced to an extreme degree. Thus, the detected average voltage value is increased, and the drying will be regarded as finished despite the existence of remaining wet cloth portions.

Accordingly, the object of this invention is to provide a control device for a drying apparatus capable of solving the aforementioned problems (i), (ii), (iii) and (iv).

In order to attain the above object, the control device of this invention comprises an instantaneous value detecting circuit having a pair of electrodes to be successively brought in contact with part of clothes stirred within a rotating drum of a drying apparatus and producing an instantaneous detection voltage to indicate the drying rate of the part of clothes between the electrodes, a comparing circuit including a memory circuit connected to the instantaneous value detecting circuit so that a stored value may vary according to the instantaneous detection voltage, whereby the stored value and a preset drying rate setting value are compared to produce a drying rate determination signal for the clothes, a setting circuit for setting the drying rate setting value, and a controlling circuit for integrating the drying rate determination signal from the comparing circuit and controlling a drying operation of the drying apparatus in accordance with the integrated value.

According to this invention, signals to indicate the resistances of part of clothes detected by the electrodes are not averaged, and the drying rate is not determined by the average value obtained. Voltages changing in accordance with the signals to indicate the resistances of the part of the clothes, i.e. the instantaneous detection voltages, are stored, the values of the stored voltages are compared with the drying rate setting value, and the drying rate determination signal is obtained from the result of the comparison. The drying operation is controlled according to the determination signal. According to such construction, the drying rates of clothes can accurately be detected without regard to the quantity of cloth and the coexistence of clothes with different drying speeds. Moreover, the time for "semidry-state takeout", as well as the time of perfect drying, can be determined with high accuracy.

This invention can be more fully understood from the following detailed description when taken in conjunction with the accompanying drawings, in which:

FIGS. 4A and 4B show waveforms for illustrating the operation of a comparing circuit shown in FIG. 1;

FIGS. 5A and 5B are enlarged views of waveforms obtained on and after time $t_{11}$ shown in FIG. 4A;

FIGS. 7A to 7C show waveforms for illustrating the operation of a comparing circuit shown in FIG. 6; and FIGS. 8A to 8C are enlarged views of waveforms obtained on and after time $t_{11}$ shown in FIG. 7A, corresponding to FIGS. 7A to 7C respectively.

Figure 1:
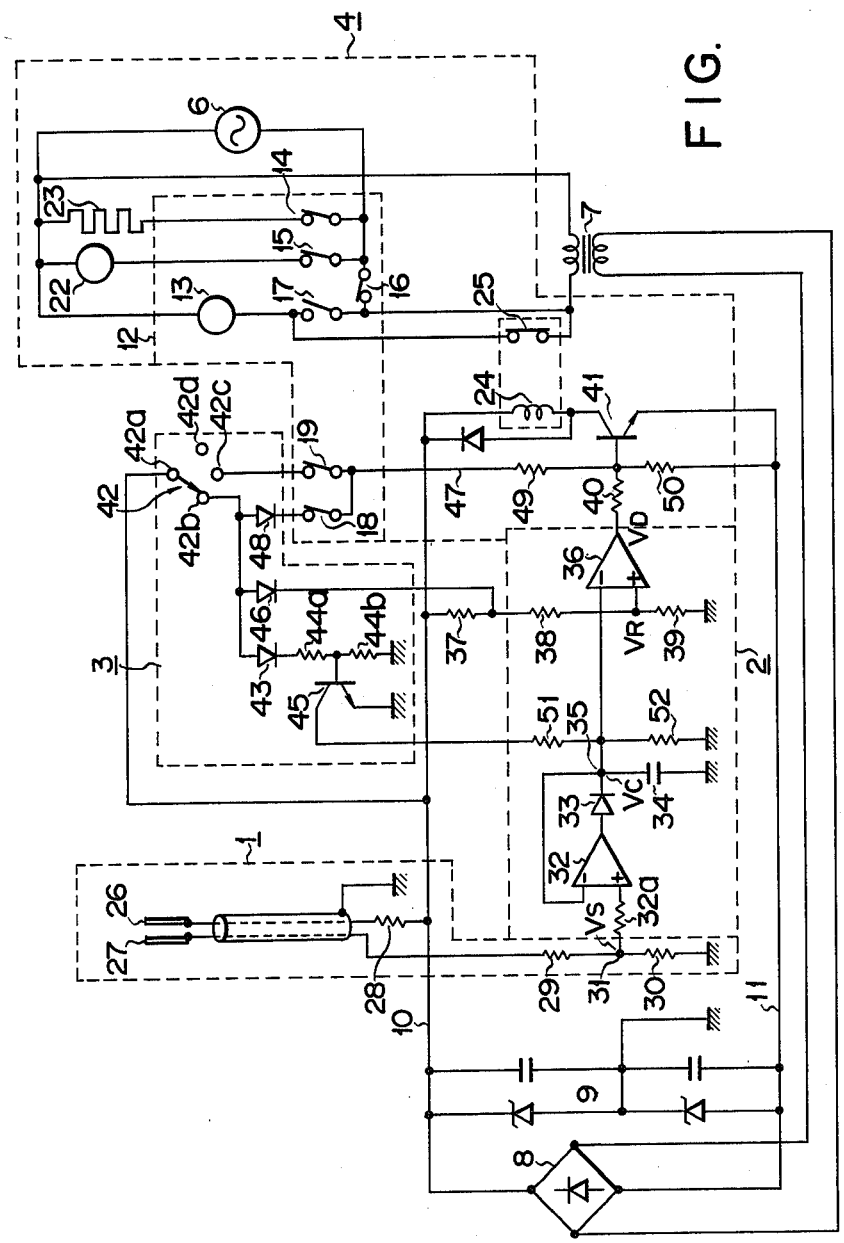
FIG. 1 is a circuit diagram showing an embodiment of this invention.
Figure 2:
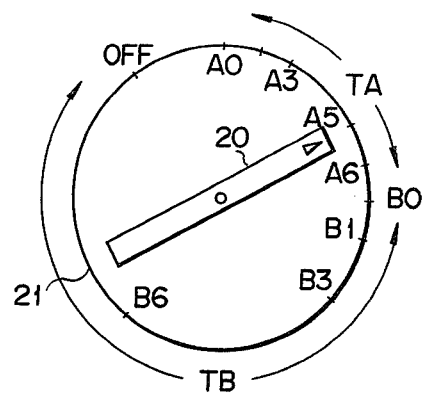
FIG. 2 is a plan view of a timer setting dial shown in FIG. 1.
Figure 3:
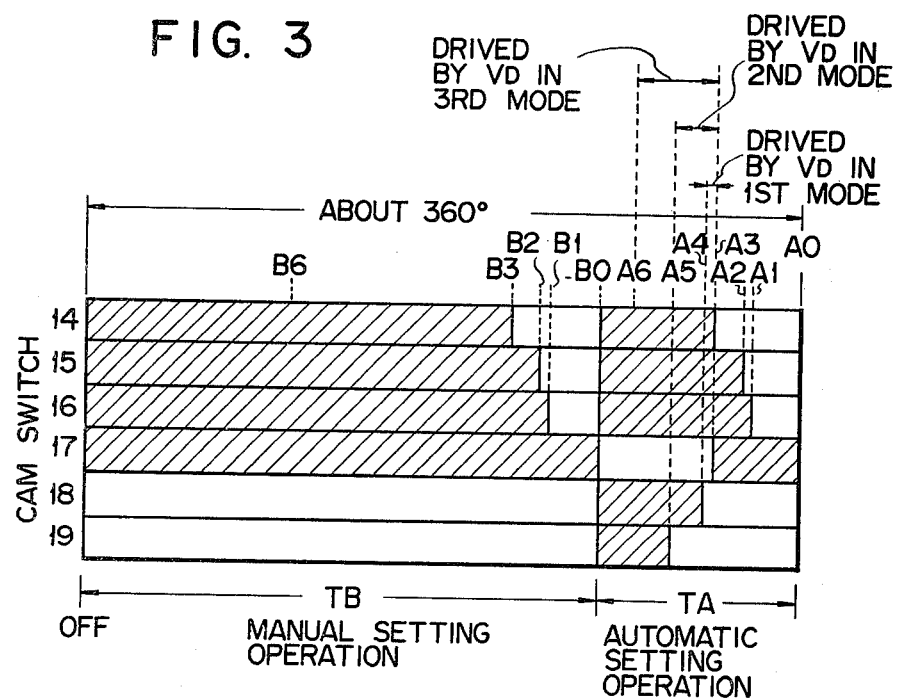
FIG. 3 is a timing chart showing the operations of a plurality of cam switches forming a control circuit shown in FIG. 1, in connection with the position of the setting dial of FIG. 2.

Referring now to the drawing of FIG. 1, an instantaneous value detecting circuit, comparing circuit, drying rate (or dryness factor) setting circuit, and drying operation controlling circuit are designated by numerals 1, 2, 3 and 4, respectively. Although these circuits are schematically shown as including components within broken-line frames, such frames are not always definite and are for ease of illustration only. Numerals 6 and 7 designate an AC power source and a transformer energized by the AC power source, respectively. The transformer 7 applies DC voltage between DC buses 10 and 11 through a full-wave rectifying circuit 8 and a smoothing circuit 9. Numeral 12 designates a timer which includes a timer motor 13 and cam switches 14 to 19 driven by the motor 13 and controlled by a cam (not shown) for operation. A dial for operating the timer 12 is shown in FIG. 2. FIG. 3 shows how the cam switches 14 to 19 are operated according to the position of a control knob 20 of the dial. In FIG. 3, oblique-lined portions represent ON time of the cam switches, while blank portions represent OFF time. In FIG. 2, numeral 21 designates a setting position index section to indicate the setting position of the control knob 20. A0, A1, ... and B0, B1, ... are symbols which represent the switching positions of the cam to operate the cam switches 14 to 19, part of the symbols being marked on the setting position index section 21 for ease of explanation. As may be seen from FIGS. 2 and 3, the timer 12 has an automatic setting region TA corresponding to a timing region between the positions A0 and B0 and a manual setting region corresponding to a timing region TB between the positions OFF and B0. Numeral 22 designates a driving motor which drives a rotating drum (not shown) and a fan (not shown) and is controlled by the cam switch 15. Numeral 23 designates a heater which serves as a heat source for hot blast to be supplied to the rotating drum and is controlled by the cam switch 14. The timer 12 is controlled not only by the cam switches 16 and 17 but also by a relay 24 without regard to the operation of the cam switches 16 and 17.

In the instantaneous value detecting circuit 1, there are arranged a pair of electrodes 26 and 27 which are successively brought in contact with part of clothes being stirred. One electrode 26 is connected to the DC bus 10 through a resistor 28, and the other electrode 27 is grounded via resistors 29 and 30. The resistance value of the resistor 30 is set at a value substantially equivalent to the cloth resistance obtained between the electrodes 26 and 27 when the dring rate of clothes becomes nearly 75% to 85%. The value 75% to 85% corresponds to the middle stage of drying or the time for "semidry-state takeout" as mentioned later. The non-grounded terminal of the resistor 30 or an instantaneous value detecting terminal 31 is grounded through an input resistor 32a of an instantaneous value storing circuit forming the comparing circuit 2, the positive terminal of an operational amplifier 32, a diode 33, and an instantaneous value storing element such as a capacitor 34. An instantaneous value output terminal 35 identical with the non-grounded terminal of the capacitor 34 is connected to the negative terminal of the operational amplifier 32. The comparing circuit 2 further includes a comparator 36 the negative input terminal of which is connected with the instantaneous value output terminal 35 of the capacitor 34. Resistors 37, 38 and 39 are connected in series between the DC bus 10 and the ground, and a voltage $V_R$ at the non-grounded terminal of the resistor 39 is applied to the positive input terminal of the comparator 36 as a drying rate setting value. At the instantaneous value detecting terminal 31 of the instantaneous value detecting circuit 1 appears an instantaneous detection voltage $V_S$ (see FIG. 4A) inversely proportional to the instantaneous value of the cloth resistance between the electrodes 26 and 27.

If the terminal voltage of the capacitor 34 for storing the instantaneous detection voltage $V_S$ is $V_C$ (FIG. 4A), the operational amplifier 32 is turned on when $V_S > V_C$ holds, so that the capacitor 34 is instantaneously charged with $V_S$. Such instantaneous charging is possible because the gain of the operational amplifier 32 is extremely high. The comparator 36 produces a high-level voltage $V_D$ (see FIGS. 4A, 4B; FIGS. 5A, 5B) when $V_C > V^R$ is given. The voltage $V_D$, which indicates that the voltage $V_C$ of the storage capacitor 34 has reached the drying rate setting value $V_R$, will hereinafter be referred to as the drying rate determination signal since it is used for determining the drying rate of clothes. The signal $V_D$ turns a transistor 41 On to rotate the timer motor 13. Thus, the signal $V_D$ is integrated by the timer motor 13, and the drying operation is controlled by the number of revolutions of the timer motor 13. In other words, the drying rate of clothes are determined by the signal $V_D$, and the drying operation is controlled by the determination result.

The drying rate setting circuit 3 includes a changeover switch 42 which is composed of contacts 42a to 42d connected with the comprising circuit 2, DC bus 10 and controlling circuit 4, as shown in FIG. 1. The changeover switch 42 is closed between the contacts 42a and 42b for "semidry-state takeout" drying operation (first mode operation), between the contacts 42a and 42c for "regular drying" operation (second mode operation), and between the contacts 42a and 42d for "thick cloth drying" operation (third mode operation).

When the changeover switch 42 is closed between the contacts 42a and 42b, a transistor 45 is turned on by interposing a diode 43 and resistors 44a and 44b in series between the DC bus 10 and the ground. Further, the potential of the DC bus 10 is applied to the junction of the resistors 37 and 38 through a diode 46. Furthermore, the gate of the transistor 41 is connected to the DC bus 10 through a diode 48, the cam switch 18, and a resistor 49. Since the gate of the transistor 41 is connected to the junction of resistors 49 and 50, the transistor 41 is turned on by a divided voltage between the buses 10 and 11 when the changeover switch 42 is closed between the contacts 42a and 42b and the cam switch 18 is closed. Resistors 51 and 52 are connected in series between the collector of the transistor 45 and the ground, the non-grounded terminal of the resistor 52 being connected to the instantaneous value output terminal 35. The transistor 45 switches the storage time of the capacitor 34 by changing the discharge time constant of the capacitor. The resistors 51 and 52 are set to such resistance values that if the discharge time constants obtained when the transistor 45 is OFF and ON are Tc and Td, respectively, we may obtain $Tc = 10 Td$.

On the other hand, the resistors, 37, 38 and 39 are set to such values that if the drying rate setting values obtained when the changeover switch 42 is closed and opened between the contacts 42a and 42b are $V_R = V_{R1}$ and $V_R = V_{R2}$, respectively, we may obtain $$V_{R1} = 10 V_{R2}.$$

Now there will be described the drying operation of the device shown in FIG. 1.

"Semidry Takeout" Drying Operation: First Drying Mode for Drying the Object to a Semidry State The changeover switch 42 is closed between the contacts 42a and 42b. Then, the transistor 45 is turned on as aforesaid, so that the discharge time constant of the capacitor 34 for instantaneous value storage is set to Td (smaller than Tc). Thereafter, the control knob 20 of the dial of the timer 12 is set to the position A6 (setting position) within the automatic setting region $T_A$. At this time, the cam switches 14, 15, 16, 18 and 19 are ON, as shown in FIG. 1, while the cam switch 17 is OFF (see FIG. 3). As a result, the driving motor 22 and the heater 23 are energized to start a drying operation. Since the cam switch 18 is closed, the transistor 41 is turned on, and the relay 24 is energized to close a normally open contact 25. Consequently, the timer motor 13 is caused to rotate. Since the timer motor 13 continues to rotate even if the cam switch 17 is OFF, the timer 12 continuously advances to and stops at the position A4 (specific position, see FIG. 3) where the cam switch 18 is turned off. After the knob 20 is set to A6, clothes in the rotating drum (not shown) are repeatedly brought in contact with the electrodes 26 and 27, so that the instantaneous detection voltage $V_S$ varies and also instantaneous storage value $V_C$ varies according to the instantaneous detection voltage $V_S$ as shown in FIGS. 4A and 5A. In the initial stage of drying, as illustrated within a time zone $t_0$ to $t_1$ of FIG. 4A, the levels of the instantaneous detection voltages $V_S$ are all above the first drying rate setting value $V_{R1}$. As the drying advances, the number of instantaneous detection voltages $V_S$ below the setting value $V_{R1}$ increases, as illustrated within a time zone $t_2$ to $t_3$. Although the number of instantaneous value detection signals below $V_{R1}$ is increased, however, the capacitor 34 charged with voltage $V_S$ higher than $V_{R1}$ will maintain the voltage $V_S$ above $V_{R1}$ as the voltage $V_C$ for a given period of time if there are such instantaneous value detection signals having a value exceeding $V_{R1}$. The given period of time depends on the discharge time constant Td of the capacitor 34. Evidently, such storage of $V_S$ higher than the drying rate setting value $V_{R1}$ implies preferential detection of portions of clothes exhibiting low drying rate. Subsequently, when the middle stage of drying (semidry state suited for "semidry-state takeout") represented by a time zone $t_4$ to $t_{10}$ is reached, the instantaneous detection voltage $V_S$ less frequently exceeds the drying rate setting value $V_{R1}$. However, if the instantaneous detection voltage $V_S$ exceeds the setting value $V_{R1}$ even for once, $V_C < V_{R1}$ will hold since the next $V_S$ is lower than $V_{R1}$. The comparator 36 produces the high-level voltage $V_D$ (drying rate determination signal) having a width equivalent to the duration of the condition $V_C < V_{R1}$. Since the relay 24 is energized each time the determination signal $V_D$ is delivered, the timer motor 13 rotates to advance the timer 12 intermittently from the stop position A4 (specific position) to A3 (heater cutoff position). Namely, the signal $V_D$ is integrated during a period of time when the timer 12 advances from the position A4 to A3. The period of time when the timer 12 advances from the position A4 to A3, which depends on the number of revolutions of the motor 13 or the integration value of $V_D$, is approximately 0.1 second, for example. When the timer 12 reaches the position A3, the cam switch 17 is turned on, so that the timer motor 13 is switched to continuous conduction, and the timer 12 starts continuous advance. Meanwhile, when the knob 20 reaches the position A3, the cam switch 14 is turned off to cut off the heater 23, so that a cold-air operation is started. When the knob 20 reaches the position A2, the cam switch 15 is turned off to cut off the driving motor 22, so that the drying operation is stopped.

In other words, the "semidry-state takeouts" drying operation has the following features. When the clothes reach the desired drying rate, the drying rate determination signal $V_D$ is produced. It is apparent from FIGS. 4A and 4B that the more the portions of clothes which have not yet reached the desired drying rate, the smaller the width of the signal $V_D$ will be. The signal $V_D$ is integrated by the timer 12 for the period between the positions A4 and A3. Since the cam switches 14 and 15 are still ON during the integration period, the drying operation is continued. However, the more the undried portions, the shorter the duration of $V_D$ is, so that the time when the clothes are dried between the positions A4 and A3 is extended. As the undried portions decrease, the drying time between the positions A4 and A3 is reduced.

Accordingly, even though the frequency of contact between the electrodes 26 and 27 is varied due to the variation of the quantity of clothes, the interval between the positions A4 and A3 will never change so long as the instantaneous detection voltage $V_S$ higher than the drying rate setting value $V_R$ is produced, so that the degree of coincidence between the drying rate setting value $V_{R1}$ and the actual drying rate of the clothes will be improved. This also applies to a case where clothes with higher and lower drying rates coexist. Thus, a drying operation suited for "semidry-state takeout" can be performed.

"Regular Drying" Operation: Second Drying Mode for Drying the Object to a Dry State The changeover switch 42 is closed between the contacts 42a and 42c. As a result, the transistor 45 is turned off ("ON" for the "semidry-state takeout" operation), so that the discharge time constant of the capacitor 34 is set to Tc (longer than Td), and the drying rate setting value $V_R$ is set to $V_{R2}$. As shown in FIG. 4A, the level of $V_{R2}$ is lower than that of $V_{R1}$, and higher drying rates may be obtained with use of $V_{R2}$. The "regular drying" means drying regular cloth to nearly 100% by automatic control. After the changeover switch 42 is shifted, the control knob 20 of the timer 12 is set to the position A6 within the automatic setting region (same as the case of "semidry-state takeout" drying operation). Then, the cam switch 19 and the transistor 41 are turned on, so that the timer 12 is forced to advance to the position A5 (specific position). In FIG. 4, a time zone on and after time $t_{11}$ following the time zone (e.g. $t_4$ to $t_{10}$) for "semidry-state takeout" corresponds to the time zone for "regular drying", which is enlargedly shown in FIGS. 5A and 5B. On and after time $t_{11}$, especially in the final stage of drying, substantially all the parts of the clothes exhibit a drying rate higher than the set drying rate $V_{R2}$ (most of instantaneous detection voltages are lower than the set value $V_{R2}$). However, extremely limited portions of the clothes, such as cuffs, exhibit lower drying rates than the set value ($V_S > V_{R2}$). Accordingly, as is evident from FIG. 5A, a period when $V_C < V_{R2}$ ($V_C$ is instantaneous storage value) holds becomes quite long. Further, the discharge time constant of the capacitor 34 is set to extremely long Tc by opening the changeover switch 42 between the contacts 42a and 42b to turn off the transistor 45, so that the drying rates of portions of clothes hard to dry can preferentially be detected with improved accuracy. Moreover, since the timer 12 is so set that the drying rate determination signal $V_D$ may be integrated during a period between the positions A5 and A3 (between A4 and A3 for "semidry-state takeout"), the hard-to-dry portions of clothes can surely be dried. The use of such integration time suggests that both the cam switches 17 and 19 are turned off at the position A5 and the timer motor 13 is intermittently driven by the signal $V_D$ through only the normally open contact 25 until the position A3 is reached. In the foregoing first drying mode, the timer 12 is intermittently advanced from the position A4 to A3 by the signal $V_D$. In this second drying mode, however, the timer 12 is intermittently advanced from the position A5 to A3 by the signal $V_D$. Thus, even the hard-to-dry portions of clothes can be dried with high reliability.

"Thick Cloth" Drying Operation: Third Drying Mode for Drying the Object with Comparatively Large Thickness The changeover switch 42 is closed between the contacts 42a and 42d. Then, the discharge time constant of the storage capacitor 34 is set to Tc (longer than Td like the case of the second drying mode), and the drying rate setting value $V_R$ is set to $V_{R2}$ (lower than $V_{R1}$). Thereafter, the timer 12 is set to the position A6. In this case, the changeover switch 42 is open between the contacts 42a and 42b and between the contacts 42a and 42c, so that unless the transistor 41 is supplied with the signal $V_D$, the timer 12 will remain at the position A6 even though the cam switches 18 and 19 are closed (see FIG. 3). Accordingly, the integration time for the signal $V_D$, i.e. the period between the point of time when the clothes are dried to a considerable degree to produce the signal $V_D$ and the point of time corresponding to the position A3 when the heater 23 is cut off, is further extended as compared with the case of the second mode drying operation. The integration time for the signal $V_D$ is extended because it takes a relatively long time for water contained in comparatively thick cloth to ooze out to the surface, that is, drying delay is caused. The drying delay is compensated by extending the integration time for the signal $V_D$, so that the degree of coincidence between the set drying rate and the actual drying rate of clothes can be increased.

"Manual Operation": Fourth Drying Mode for Drying the Object Only During the Period Manually Set In this case, the control knob 20 of the timer 12 is set to a desired position within the manual setting region TB. The setting positions of the contacts of the changeover switch 42 have no connection with this operation. The cam switches 14, 15, 16 and 17 will be turned on so long as the timer 12 is set within the region on the left of the position B3 of FIG. 3, so that the drying time for clothes will be reduced to the setting time for the timer 12.

In the embodiment shown in FIG. 1, the drying rate setting value $V_R$ and the storage time of the capacitor 34 can be changed simultaneously by shifting the changeover switch 42. The storage time is changed by varying the discharge time constant of the capacitor 34. At the same time, the integration time for the signal $V_D$ can also be changed. It will be seen from FIG. 4A that the change of the voltage $V_C$ of the capacitor 34 responds not only to the change of the discharge time constant but to the amplitude values of a plurality of instantaneous detection voltages $V_S$ coupled with one another.

Figure 6:
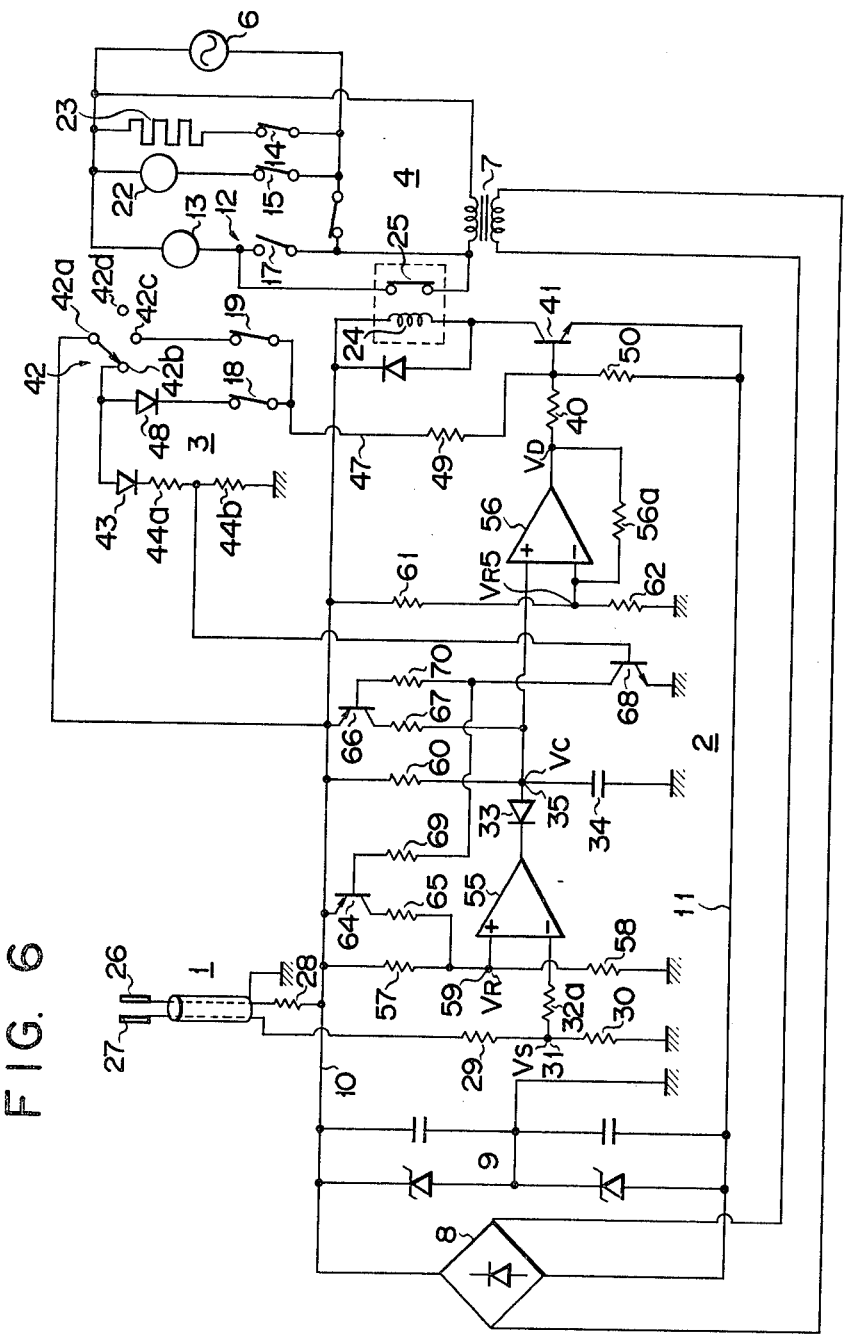
FIG. 6 is a circuit diagram showing an alternative embodiment of the invention.

Referring now to FIGS. 2, 3, 6, 7A to 7C and 8A to 8C, there will be described another embodiment of this invention. In FIG. 6, an instantaneous value detecting circuit 1, a changeover switch 42, and a drying operation controlling circuit 4 are the same as those of the foregoing embodiment shown in FIG. 1. Therefore, the same parts or elements are designated by like reference numerals of FIG. 1, and the description of such parts will be omitted. A comparing circuit 2 in FIG. 6 includes an operational amplifier 55, a capacitor 34 for storing instantaneous values, and a comparator 56. A drying rate setting value $V_R$ is applied to the positive input terminal of the operational amplifier 55. Given as the drying rate setting value $V_R$ is the potential at a junction 59 of resistors 57 and 58 connected in series between a DC bus 10 and the ground. An instantaneous detection voltage $V_S$ of the instantaneous value detecting circuit 1 is applied to the negative input terminal of the operational amplifier 55. A non-grounded terminal 35 of the capacitor 34 is connected with the output terminal of the operational amplifier 55 through a diode 33 of such polarity as illustrated, and also is connected to the DC bus 10 through a resistor 60. The capacitor 34 is discharged through the diode 33 when the output of the operational amplifier 55 is reduced to low level ($V_S > V_R$). The positive input terminal of the comparator 56 is supplied with a non-grounded terminal voltage $V_C$ of the capacitor 34, while the negative input terminal of the comparator 56 is supplied with a potential $V_{R5}$ at the junction of resistors 61 and 62 connected in series between the DC bus 10 and the ground as a reference value. Further, the output of the comparator 56 or a drying rate determination signal $V_D$ is applied to the gate of a transistor 41 through a resistor 40, and also is applied to the negative input terminal of the comparator 56 through a feedback resistor 56a. The emitter-collector path of a transistor 64 is connected in parallel with the resistor 57 through a resistor 65, and a transistor 66 is connected in parallel with the resistor 60 through a resistor 67. The gate of the transistor 66 is connected to the collector of a transistor 68 through a resistor 70, and the emitter of the transistor 68 is grounded. The gate of the transistor 64 is connected to the collector of the transistor 68 through a resistor 69. In the changeover switch 42, a contact 42a is connected to the DC bus 10, a contact 42b is connected to the ground through a diode 43 and resistors 44a and 44b and also connected to one end of a cam switch 18 through a diode 48, and a contact 42c is connected to one end of a cam switch 19, the other ends of the cam switches 18 and 19 being connected to the gate of the transistor 41 through a resistor 49, in the same manner as the embodiment of FIG. 1. Hereupon, the junction of the resistors 44a and 44b is connected to the gate of the transistor 68. A charging circuit for the capacitor 34 is formed of the resistor 60 and a series circuit of a transistor 66 and a resistor 67 connected in parallel with the resistor 60. The charging time constant of the capacitor 34 is set to T1 and T2 (T2=10T1) when the transistor 66 is ON and OFF, respectively. Moreover, the drying rate setting value $V_R$ is set to $V_{R4}$ at high level and $V_{R3}$ at low level ($V_{R4}=10V_{R3}$) when the transistor 64 is ON and OFF, respectively (see FIG. 7A). When $V_C>V_{R5}$ holds, the comparator 56 produces a high-level drying rate determination signal $V_D$, turning on the transistor 41 to close a normally open contact 25. When the changeover switch 42 is closed between the contacts 42a and 42b, the transistor 68 is turned on, and the ground potential is applied to the gates of the transistors 64 and 66 to turn on both these transistors. When the changeover switch 42 is closed between the contacts 42a and 42c, the potential of the DC bus 10 is applied to the gate of the transistor 41 via the cam switch 19 to energize a relay 24. Although similar to the operation of the embodiment of FIG. 1, the operation of the device of the present embodiment will be described in brief with reference to the several operation modes.

FIRST DRYING MODE OPERATION

The changeover switch 42 is closed between the contacts 42a and 42b, so that the transistors 68, 64 and 66 are turned on, and the charging time constant of the capacitor 34 is set to a small value of T1, and the drying rate setting value $V_R$ is set to $V_{R4}$ at high level (see FIG. 7A). Then, the knob 20 of the timer 12 is set to the position A6 within the automatic setting region TA. Since the cam switch 18 is closed, the transistor 41 and the normally open contact 25 are both ON. Thus, the timer 12 is continuously advanced to the position A4. Since the cam switch 17 is OFF between the positions A4 and A3, the timer 12 is continued to be advanced by the signal $V_D$. Meanwhile, the capacitor 34 is charged when $V_S<V_{R4}$ holds, and discharged when $V_S>V_{R4}$ holds. In a time zone $t_0$ to $t_1$ at the initial stage of drying, however, all the signals $V_S$ are $V_S>V_{R4}$, so that the voltage $V_C$ of the capacitor 34 is substantially constant and is lower than the reference voltage $V_{R5}$, as shown in FIG. 7B. Accordingly, the signal $V_D$ is not produced during such period, as shown in FIG. 7C. However, as the drying of clothes advances, e.g. within a time zone $t_2$ to $t_3$, the relationship $V_S<V_{R4}$ is seen with increased frequency, so that the charge and discharge of the capacitor 34 are done as shown in FIG. 7B. In this time zone $t_2$ to $t_3$, however, the value of $V_C$ never exceeds the reference value $V_{R5}$, so that the signal $V_D$ is not produced. When the drying further advances to reach a time zone $t_4$ to $t_{10}$, for example, the relationship $V_S<V_{R4}$ is seen with further increased frequency. Moreover, the charging time of the capacitor 34 is made longer, so that the periods when $V_C$ is higher than $V_{R5}$ are extended. The signals $V_D$ are produced correspondingly to the periods when $V_C$ is higher than $V_{R5}$, as shown in FIG. 7C. In the first drying mode operation, the charging time constant is set to a small value of T1 by setting the drying rate $V_R$ to $V_{R4}$ at high level and turning on the transistor 66 in order that the sampling period of the signal $V_D$ may be reduced to enable proper semidry-state takeout. This is done because if the charging time constant is long, the time for $V_C$ to exceed $V_{R5}$ is prolonged to allow the drying of clothes to advance in the meantime, making the clothes unsuited for the proper semidry-state takeout. As for the integration of the signal $V_D$, it has already been described in connection with the embodiment of FIG. 1, so that such description will not be repeated here.

SECOND DRYING MODE OPERATION

When the changeover switch 42 is closed between the contacts 42a and 42c, the transistors 68, 66 and 64 are turned off, the charging time constant of the capacitor 34 is set to a large value of T2, and the drying rate setting value $V_R$ is set to $V_{R3}$ at low level. Then, the control knob 20 of the timer 12 is set to the position A6 within the automatic setting region TA. Since the cam switch 19 is closed, the timer 12 is forced to advance from the position A6 to A5 in the same manner as the embodiment of FIG. 1. FIGS. 8A to 8C show the relationships between $V_S$, $V_{R3}$, $V_{R5}$, $V_C$ and $V_D$ on and after time $t_{11}$. In the time zone on and after time $t_{11}$, the drying rates of most portions of the clothes are lower than the set drying rate $V_{R3}$, so we obtain $V_S<V_{R3}$. $V_S>V_{R3}$ is obtained only with cuffs and the like, so that such relation is established as quite long intervals. Further, since the charging time constant of the capacitor 34 is set to T2 longer than T1 for the first drying operation mode, undried portions are detected with higher priority and dried during the detection period, as shown in FIGS. 8A to 8C. Furthermore, the period of time when the timer 12 reaches the specific portion A5 and also the position A3 where the heater 23 is cut off by the cam switch 14 is set to approximately 10 minutes (related to the width and cycle of the signal $V_D$), so that the hard-to-dry portions of the clothes can surely be dried.

THIRD DRYING MODE OPERATION

When the changeover switch 42 is closed between the contacts 42a and 42d, the charging time constant of the capacitor 34 is set to T2 (longer than T1, same as the case of second mode operation), and the drying rate setting value $V_R$ is set to $V_{R3}$ (lower than $V_{R4}$, same as the case of second mode operation. Then, the timer 12 is set to the position A6. Since the cam switch 17 is OFF and the changeover switch 42 is open between the contacts 42a and 42b and between the contacts 42a and 42c, the transistor 41 is OFF without regard to the ON-OFF state of the cam switches 18 and 19. Accordingly, the timer 12 remains at the position A6, and will be driven only when the signal $V_D$ is applied to the transistor 41. Thus, the timer 12 is driven from the position A6 to A3 by the integration value of the signal $V_D$. In this operation mode, the position A6 can be regarded both as a setting position and a specific position (position where the drive is started only by the signal $V_D$). As described in connection with FIG. 1, the drying delay of thick cloth is compensated by increasing the integration value of the signal $V_D$.

FOURTH DRYING MODE OPERATION

Just the same as the embodiment of FIG. 1.

In the embodiment shown in FIG. 6, the storage voltage of the capacitor 34 changes not only with the instantaneous detection voltage $V_S$ but also with the charging time constant. Like the embodiment of FIG. 1, moreover, the drying rate setting value $V_R$, storage time of the memory circuit, and integration value of the signal $V_D$ and be changed simultaneously by shifting the changeover switch 42.

This invention is not limited to the above-mentioned embodiments. In order to avoid the influence of noise from the commercial power source 6, for example, a capacitor may be connected in parallel with the resistor 30. If the resistance value of the resistor 30 is 2.2 M, for example, a capacitor of approximately 0.1 μF is used so as not to retard the detection of instantaneous values. The configuration of the instantaneous value memory circuit is not limited to the ones shown in the drawings.

What we claim is:

1. A control device for a clothing drying apparatus, comprising:
   instantaneous value detecting means having a pair of electrodes to be successively brought in contact with part of clothes stirred within a rotating drum of said drying apparatus for producing an instantaneous detection voltage indicative of the drying rate of the part of clothes in contact with said electrodes;
   setting means for establishing a preset drying rate setting value;
   comparing means, connected to said instantaneous value detecting means, for (a) storing a value of the instantaneous detection voltage and updating the stored value with certain changes in the instantaneous detection voltage (b) providing a function of the stored and updated values and (c) comparing the function with said preset drying rate setting value to produce a drying rate determination signal for said clothes; and
   controlling means for integrating the drying rate determination signal from said comparing means and controlling a drying operation of said drying apparatus in accordance with the integrated value so as to bring the drying operation to a conclusion as the integral of the drying rate determination signal increases.

2. A control device for a drying apparatus according to claim 1, wherein said comparing means includes an operational amplifier, a capacitor connected between the output terminal of said operational amplifier and circuit ground and constituting a memory element, and a comparator,
   said operational amplifier receiving said instantaneous detection voltage as a first input and a non-grounded terminal voltage of said capacitor as a second input, and
   said comparator receiving said drying rate setting value as a first input and the non-grounded terminal voltage of said capacitor as a second input and producing said drying rate determination signal.

3. A control device for a drying apparatus according to claim 1, wherein said comparing means includes an operational amplifier, a capacitor connected between the output terminal of said operational amplifier and the ground and constituting a memory element, and a comparator,
   said operational amplifier receiving said drying rate setting value as a first input and said instantaneous detection voltage as a second input, and
   said comparator receiving the non-grounded terminal voltage of said capacitor as a first input and a reference voltage at a given level as a second input and producing said drying rate determination signal.

4. A control device for a drying apparatus according to claim 1, wherein said controlling means includes a timer provided with a timer motor, said timer motor rotating in accordance with the integration value of said drying rate determination signal and cutting off a heat source of said drying apparatus when said integration value reaches a set integration value.

5. A control device for a drying apparatus according to claim 4, wherein said timer has an automatic setting region in which said drying apparatus is continuously driven without regard to said drying rate determination signal during a period between a first position set for the start of the drying operation of said drying apparatus and a second position, and is intermittently driven by said drying rate determination signal during a period between said second position and a third position where said heat source is cut off.

6. A control device for a drying apparatus according to claim 5, wherein said timer further has a manual setting region so that when said timer is set at any optional position within said manual setting region, a drying operation is performed continuously for a set time and said heat source is cut off after the passage of the set time.

7. A control device for a drying apparatus according to claim 1, wherein said setting means for setting said drying rate setting value includes a changeover switch coupled to said comparing means so that said drying rate setting value and the function of the comparing means may be changed simultaneously by shifting said changeover switch.

8. A control device for a drying apparatus according to claim 7, wherein said changeover switch is coupled to said comparing means so that the integration time for said drying rate determination signal may also be changed.

9. A control device for a drying apparatus according to claim 8, wherein said changeover switch includes first, second and third changeover contacts for operating said drying apparatus in first, second and third drying modes so that clothes are dried to a predetermined semidry state in said first drying mode, the clothes are dried almost perfectly in said second drying mode, and relatively thick cloth is dried in said third drying mode.

* * * * *